United States Patent
Cao et al.

(10) Patent No.: US 9,626,247 B2
(45) Date of Patent: Apr. 18, 2017

(54) METHOD FOR SCHEDULING HIGH SPEED CACHE OF ASYMMETRIC DISK ARRAY

(71) Applicant: Huazhong University of Science and Technology, Wuhan (CN)

(72) Inventors: Qiang Cao, Wuhan (CN); Shenggang Wan, Wuhan (CN); Si Wu, Wuhan (CN); Changsheng Xie, Wuhan (CN)

(73) Assignee: HUAZHONG UNIVERSITY OF SCIENCE AND TECHONLOGY, Wuhan (CN)

( * ) Notice: Subject to any disclaimer, the term of this patent is extended or adjusted under 35 U.S.C. 154(b) by 115 days.

(21) Appl. No.: 14/746,869

(22) Filed: Jun. 23, 2015

(65) Prior Publication Data
US 2016/0147601 A1  May 26, 2016

(30) Foreign Application Priority Data
Nov. 21, 2014 (CN) .......................... 2014 1 0674375

(51) Int. Cl.
*G06F 12/123* (2016.01)
*G06F 11/10* (2006.01)
*G06F 12/122* (2016.01)
*G06F 12/128* (2016.01)
*G06F 12/0871* (2016.01)
*G06F 11/20* (2006.01)

(52) U.S. Cl.
CPC ...... *G06F 11/1088* (2013.01); *G06F 11/2058* (2013.01); *G06F 12/0871* (2013.01); *G06F 12/122* (2013.01); *G06F 12/128* (2013.01); G06F 2201/855 (2013.01); G06F 2212/604 (2013.01); G06F 2212/69 (2013.01)

(58) Field of Classification Search
CPC ............. G06F 11/1076; G06F 11/1666; G06F 11/1092
USPC ................................. 714/6.24, 6.32
See application file for complete search history.

(56) References Cited

U.S. PATENT DOCUMENTS 7,930,487 B1 * 4/2011 Faibish ................. G06F 21/805
                                            711/113
8,402,226 B1 * 3/2013 Faibish ............... G06F 12/0804
                                            710/52

(Continued)

OTHER PUBLICATIONS

Megiddo et al., "Outperforming LRU with an adaptive replacement cache algorithm," in Computer, vol. 37, No. 4, pp. 58-65, Apr. 2004.*

Primary Examiner — Chae Ko
(74) Attorney, Agent, or Firm — Matthias Scholl, PC; Matthias Scholl

(57) ABSTRACT

A method for asymmetrically scheduling buffer cache of disk array. The method including: (1) detecting whether access from a upper layer is hit in a buffer cache, proceeding to (7) if yes, and proceeding to (2) if no; (2) detecting whether the buffer cache is full, proceeding to (3) if yes, and proceeding to (5) if no; (3) detecting whether the number of pages of a sacrificial disk is greater than a threshold, proceeding to (4) if yes, and proceeding to (6) if no; (4) selecting and replacing a cold page of the sacrificial disk; (5) buffering data requested by a user in a blank page in the buffer cache; (6) selecting and replacing all cold pages of the buffer cache; and (7) reading or writing the data, and changing positions or status thereof in pages of the buffer cache.

16 Claims, 4 Drawing Sheets

(56) References Cited

U.S. PATENT DOCUMENTS

| | | | |
|---|---|---|---|
| 9,021,222 B1* | 4/2015 | Sadhu | G06F 11/1446 |
| | | | 711/144 |
| 9,075,754 B1* | 7/2015 | Sadhu | G06F 11/1458 |
| 9,135,123 B1* | 9/2015 | Armangau | G06F 11/1471 |
| 2005/0193160 A1* | 9/2005 | Bhatt | G06F 12/0897 |
| | | | 711/3 |
| 2008/0114930 A1* | 5/2008 | Sanvido | G06F 12/0866 |
| | | | 711/113 |
| 2008/0232592 A1* | 9/2008 | Lee | H04L 9/0894 |
| | | | 380/277 |
| 2009/0037663 A1* | 2/2009 | Hondou | G06F 12/0862 |
| | | | 711/137 |
| 2012/0096226 A1* | 4/2012 | Thompson | G06F 12/121 |
| | | | 711/136 |

* cited by examiner

METHOD FOR SCHEDULING HIGH SPEED CACHE OF ASYMMETRIC DISK ARRAY

CROSS-REFERENCE TO RELATED APPLICATIONS

Pursuant to 35 U.S.C. §119 and the Paris Convention Treaty, this application claims the benefit of Chinese Patent Application No. 201410674375.6 filed Nov. 21, 2014, the contents of which are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a method for asymmetrically scheduling buffer cache of a disk array.

Description of the Related Art

Reliability and availability are two important criterions in assessing quality of online storage service. A redundant array of independent disks (RAID) is one popular option for providing highly reliable and available data access service. Recently, various RAID specifications with higher fault-tolerant ability have been employed as they can recover all lost data even if two or more disks fail, and provide non-interrupted online service.

From a user's perspective, an average response time of a storage system, especially a storage system providing online service, is a key criterion in assessing service quality thereof. However, as a disk within tolerance of the disk array fails, to reconstruct data that are lost due to the disk's failure and to provide online service, read/write workflow generated by data reconstruction and workflow generated by a user request are to mutually affect each other, resulting in decline of the service quality. Many studies indicate that compared with a no-fault mode, an average response time of a user's read/write request under a degradation mode with recovery workflow may be significantly affected, and may be increased by several or several tens of times. Meanwhile, time consumption of online reconstruction may be increased greatly in comparison with below-the-line reconstruction. Therefore, to decrease the average response time of the user's request and reconstruction time are the most effective way for improving quality of service provided to a frontend user, as well as data availability.

Nowadays buffer caches are widely used, and many cache replacement algorithms are used for solving a problem of disk delay. However, conventional cache replacement algorithms only take a RAID system operating at the no-fault mode into account, and cannot be applied to a RAID system operating in a failure mode (namely some disks of a disk array fail). Under the failure mode, the disk array needs to read data of some survival disks (the number is determined by a configuration of the RAID system) for reconstruction, so as to recover data of a failed disk. Taking a RAID-6 as an example, if there is one failed disk out of n disks forming the disk array (n is an integer greater than or equal to 3), data of n−2 survival disks need to be read for reconstruction, and the remaining one disk does not need to participate in the reconstruction. In other words, large amount of reconstruction I/O flow may exist on the n−2 disks. However, conventional cache replacement algorithms do not consider this situation and divide a buffer area for each disk. Instead, these algorithms use global caches, enabling a buffer area of a reconstructed disk to have the same buffer capacity as that of a disk not involved in reconstruction, causing imbalance of I/O requests reaching the disk, and thus decreasing a reconstruction speed and degrading I/O performance of frontend applications.

SUMMARY OF THE INVENTION

In view of the above-mentioned problems, it is an objective of the invention to provide a method for asymmetrically scheduling buffer cache of disk array that is capable of reducing the number of I/O requests for accessing the failed disk and reconstructed disks and improving performance of a RAID storage system by selecting a disk not involved in reconstruction as the sacrificial disk, decreasing buffer size of the sacrificial disk, and increasing buffer size of the reconstructing disk during failure of the disk array, and of increasing a reconstruction speed of the failed disk, decreasing response time of an I/O request from a front-end user, and improving performance, availability and reliability of the disk array.

To achieve the above objective, according to one embodiment of the present invention, there is provided a method for asymmetrically scheduling buffer cache of disk array, the method comprising:

(1) detecting whether access from a upper layer is hit in a buffer cache, proceeding to (7) if yes, and proceeding to (2) if no;

(2) detecting whether the buffer cache is full, proceeding to (3) if yes, and proceeding to (5) if no;

(3) detecting whether the number of pages of a sacrificial disk is greater than a threshold, proceeding to (4) if yes, and proceeding to (6) if no, the sacrificial disk being a disk not involved in disk reconstruction;

(4) selecting and replacing a cold page of the sacrificial disk;

(5) buffering data requested by a user in a blank page in the buffer cache;

(6) selecting and replacing all cold pages of the buffer cache; and (7) reading or writing the data, and changing positions or status thereof in pages of the buffer cache.

In a class of this embodiment, as the method is applied to a RAID-6 system in which 1 out of n disks fails, the sacrificial disk selects any one of n−1 survival disk, and reads remaining n−2 disks for reconstructing data on the failed disk, where n is greater than or equal to 3.

In a class of this embodiment, as the method is applied to a RAID-10 system in which 1 out of n disks fails, a mirror disk of the failed disk is read for reconstructing data, and remaining n−2 disks are sacrificial disks, where n is greater than or equal to 4.

In a class of this embodiment, the threshold is proportional to an arrival rate of a user's I/O request.

In a class of this embodiment, as the method is based on a LRU algorithm, the buffer cache comprises a global LRU list and a local LRU list, the local LRU list operates to store buffer pages of one disk, and the global LRU list operates to store buffer pages of all disks.

In a class of this embodiment, in (4), the cold page of the sacrificial disk is an end of a local LRU list corresponding to the sacrificial disk.

In a class of this embodiment, in (6), each of the cold pages of the buffer cache is an end of the global LRU list.

In a class of this embodiment, in (4), the cold page of the sacrificial disk is a first page obtained by searching upwardly from an end of the global LRU list.

According to another embodiment of the present invention, there is provided a method for asymmetrically scheduling buffer cache of disk array, the method comprising:

(1) detecting whether access from a upper layer is hit in a buffer cache, proceeding to (7) if yes, and proceeding to (2) if no;

(2) detecting whether the buffer cache is full, proceeding to (3) if yes, and proceeding to (5) if no;

(3) detecting whether response time of a sacrificial disk is greater than that of remaining disks, proceeding to (4) if yes, and proceeding to (6) if no, the sacrificial disk being a disk not involved in disk reconstruction;

(4) selecting and replacing a cold page of the sacrificial disk;

(5) buffering data requested by a user in a blank page in the buffer cache;

(6) selecting and replacing all cold pages of the buffer cache; and (7) reading or writing the data, and changing positions or status thereof in pages of the buffer cache.

To summarize, this invention has the following advantages over the prior art:

1. The method decreases the number of I/O requests for accessing the failed disk and reconstructed disks by reducing cache on the sacrificial disk as the disk array fails.

2. The method increases the number of pages of the reconstructed disk and a hit rate thereof, reduces effect of user's I/O flow on reconstruction I/O flow, effect of the reconstruction I/O flow on the user's I/O flow, and response time of the user's I/O flow, speeds up the reconstruction process, and decreases reconstruction time by setting the threshold on the sacrificial disk, and selecting and replacing pages of the sacrificial disk as the number of pages of the sacrificial disk is greater than the threshold.

3. The method is capable of improving overall performance of the disk array, as well as the reliability and performance of a storage system comprising the disk array.

BRIEF DESCRIPTION OF ACCOMPANYING DRAWINGS

SPECIFIC EMBODIMENTS OF THE INVENTION

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Figure 1:
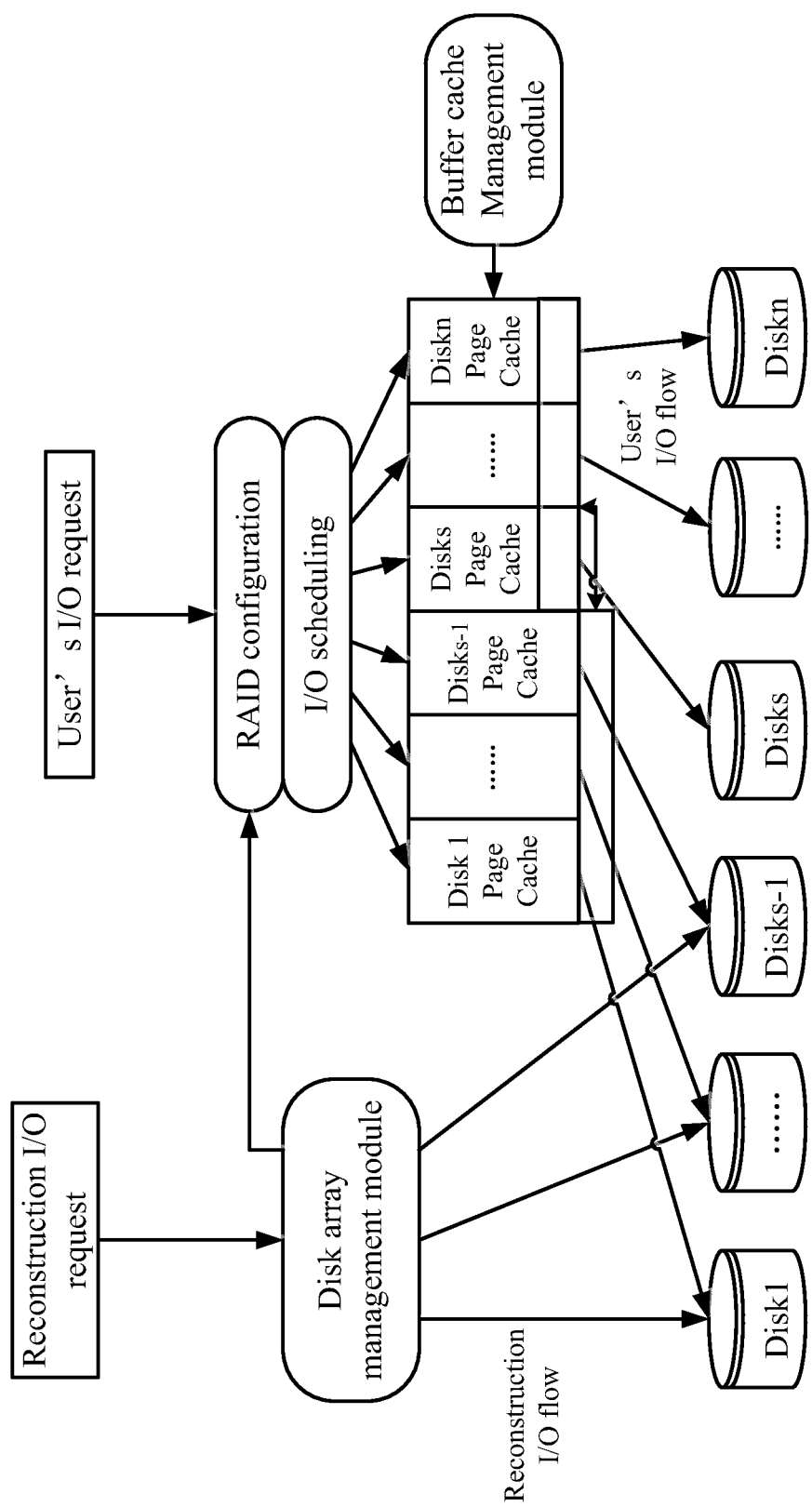
FIG. 1 illustrates principle of a method for asymmetrically scheduling buffer cache of disk array of an exemplary embodiment of the invention.

As shown in FIG. 1, principle of a method for asymmetrically scheduling buffer cache of disk array of an exemplary embodiment of the invention is illustrated. As one or more of a disk array (comprising a first disk, a second disk, ..., a $n^{th}$ disk) fail, a disk array management module is to start a reconstruction process. The reconstruction process first transmits reconstruction I/O flow (shown as dashed arrows in FIG. 1) to constructed disks (namely the first disk to the $(s-1)^{th}$ disk) according to configuration of a RAID system. At the time, the disk array still needs to provide online service and generate a user's I/O request operating to facilitate conversion from a logical address to a physical address based on the configuration of the RAID system, along with I/O convergence via an I/O scheduling layer. Firstly the user's I/O request arrives at a buffer cache of a disk, if it is hit in the buffer cache, data are read or written and then returned, and otherwise user's I/O flow is generated for the disk (shown as solid arrows in FIG. 1). The buffer cache management module manages (comprising selecting and replacing, refreshing and so on) pages in the buffer cache. As shown in FIG. 1, the invention reduces interaction between the user's I/O flow and reconstruction I/O flow by recording page cache of different disks, decreasing cache of disks not involved in reconstruction (the $s^{th}$ disk to the $n^{th}$ disk), namely cache of the sacrificial disk, and increasing cache of the reconstructed disks.

Figure 2:
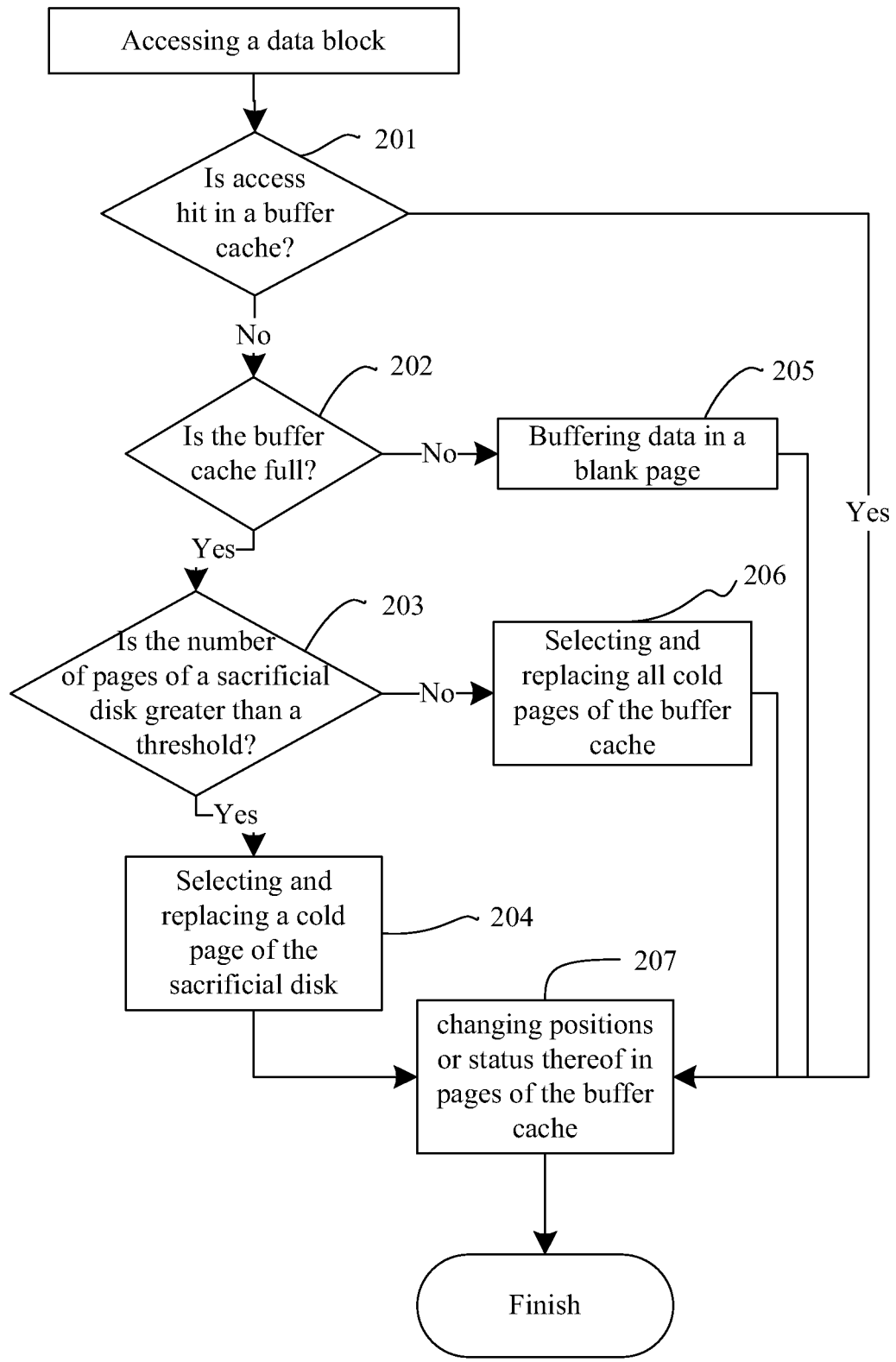
FIG. 2 is a flowchart of a method for asymmetrically scheduling buffer cache of disk array of an exemplary embodiment of the invention.

As shown in FIG. 2, a method for asymmetrically scheduling buffer cache for disk array of an exemplary embodiment of the invention comprises steps of:

S201: detecting whether access from a upper layer is hit in a buffer cache, proceeding to S207 if yes, and proceeding to S202 if no;

S202: detecting whether the buffer cache is full, proceeding to S203 if yes, and proceeding to S205 if no (indicating there is an empty page available);

S203: detecting whether the number of pages of a sacrificial disk is greater than a threshold, proceeding to S204 if yes, and proceeding to S206 if no; the sacrificial disk is a disk not involved in disk reconstruction, and the threshold is proportional to an arrival rate of a user's I/O request;

S204: selecting and replacing a cold page of the sacrificial disk; specifically, a method of selecting the cold page of the sacrificial disk is determined by a cache replacement algorithm on a lower layer;

S205: buffering data requested by a user in a blank page in the buffer cache;

S206: selecting and replacing all cold pages of the buffer cache; specifically, a method of selecting all the cold pages of the buffer cache is determined by a cache replacement algorithm on a lower layer;

S207: reading or writing the data, and changing positions or status thereof in pages of the buffer cache. Specifically, a method of changing is determined by a cache replacement algorithm on a lower layer.

The replacing process comprises determining whether a page is dirty, writing back data on the page and reading the data into the cache if yes, otherwise directly reading the data into the cache.

Alternatively, the above-mentioned S203 may be: detecting whether response time of a sacrificial disk is greater than that of remaining disks, proceeding to S204 if yes, and proceeding to S206 if no.

EXAMPLE 1

A method for asymmetrically scheduling buffer cache of disk array of the invention in combination with a Least Recently Used (LRU) algorithm is described hereinafter, and a RAID-6 system comprising n disks (where one disk fails, and n is greater than or equal to 3) is set forth as an example.

In the LRU algorithm, a weight of a buffer page is determined by a storage period, which indicates a timestamp of last storage, namely an access serial number. In this embodiment, the method for asymmetrically scheduling buffer cache of disk array uses the LRU algorithm to determine a buffer page that needs to be removed according to the weight.

In this embodiment, the buffer cache comprises a global LRU list and a local LRU list, the local LRU list operates to store buffer pages of one disk, and the global LRU list operates to store buffer pages of all disks.

As one disk of the RAID-6 system fails, a sacrificial disk may select from any one of n−1 survival disk, and read remaining n−2 disks for reconstructing data on the failed disk.

Figure 3:
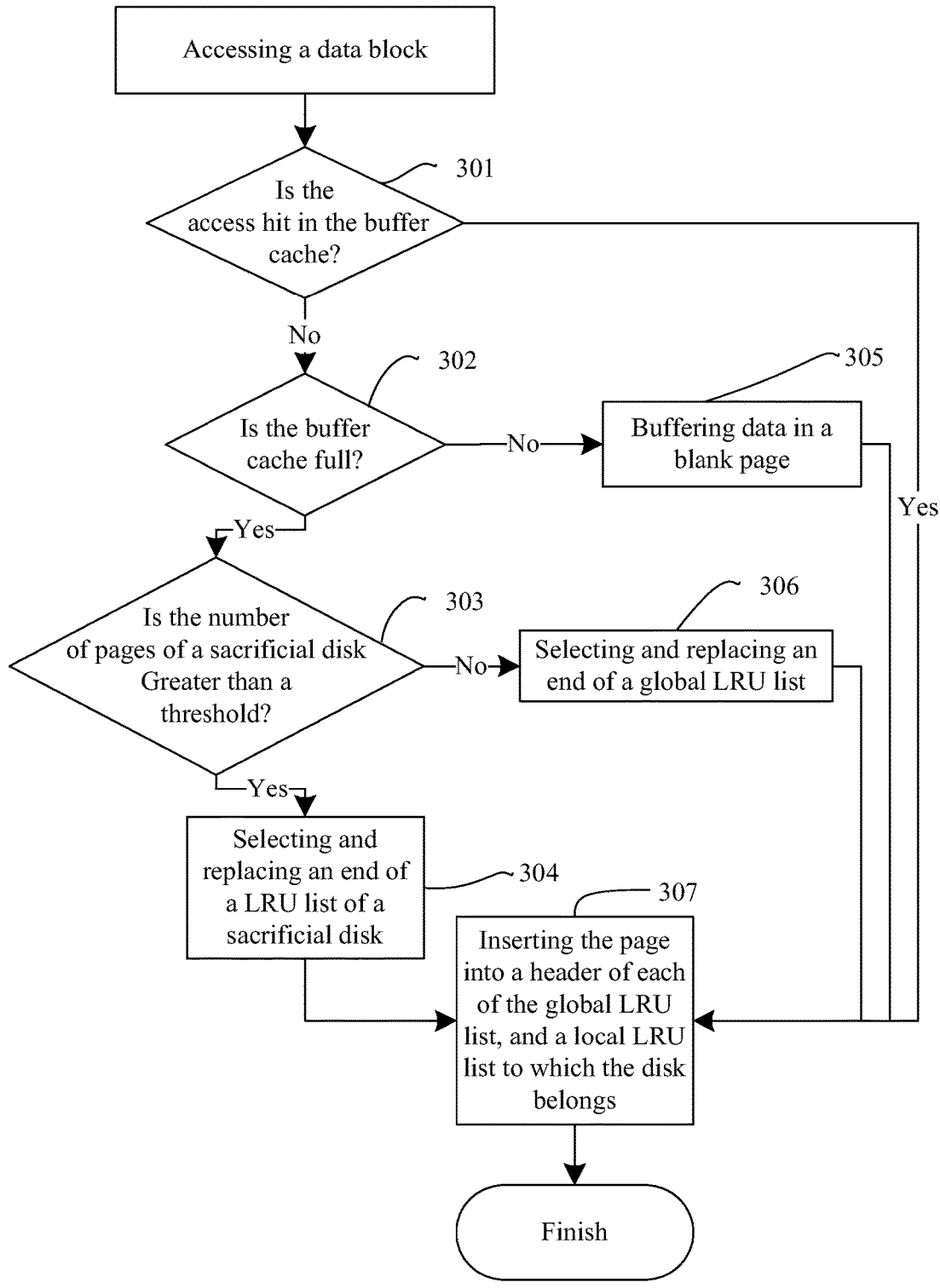
FIG. 3 is a flowchart of a LRU-based method for asymmetrically scheduling buffer cache of disk array applied to a RAID-6 system.

As shown in FIG. 3, a LRU-based method for asymmetrically scheduling buffer cache of disk array applied to the RAID-6 system comprises steps of:

S301: detecting whether access from a upper layer is hit in a buffer cache, proceeding to S307 if yes, and proceeding to S302 if no;

S302: detecting whether the buffer cache is full, proceeding to S303 if yes, and proceeding to S305 if no (indicating there is an empty page available);

S303: detecting whether the number of pages of a sacrificial disk is greater than a threshold, proceeding to S304 if yes, and proceeding to S306 if no;

S304: selecting and replacing an end of a local LRU list corresponding to the sacrificial disk (namely a cold page of the sacrificial disk);

S305: buffering data requested by a user in a blank page in the buffer cache, and reading or writing the data;

S306: selecting and replacing the end of the global LRU list (namely all cold pages of the buffer cache);

S307: reading or writing the data, and inserting the page into a header of the global LRU list, and a local LRU list to which the disk belongs.

EXAMPLE 2

A method asymmetrically scheduling buffer cache of disk array of the invention in combination with a Least Recently Used (LRU) algorithm is described hereinafter, and a RAID-10 system comprising n disks (where one disk fails, and n is greater than or equal to 4) is set forth as an example.

In this embodiment, the buffer cache comprises a global LRU list and a local LRU list, the local LRU list operates to store buffer pages of one disk, and the global LRU list operates to store buffer pages of all disks.

As one disk out of n disks of the RAID-10 system fails, a mirror disk of the failed disk is read for reconstructing data, and remaining n−2 disks are sacrificial disks.

Figure 4:
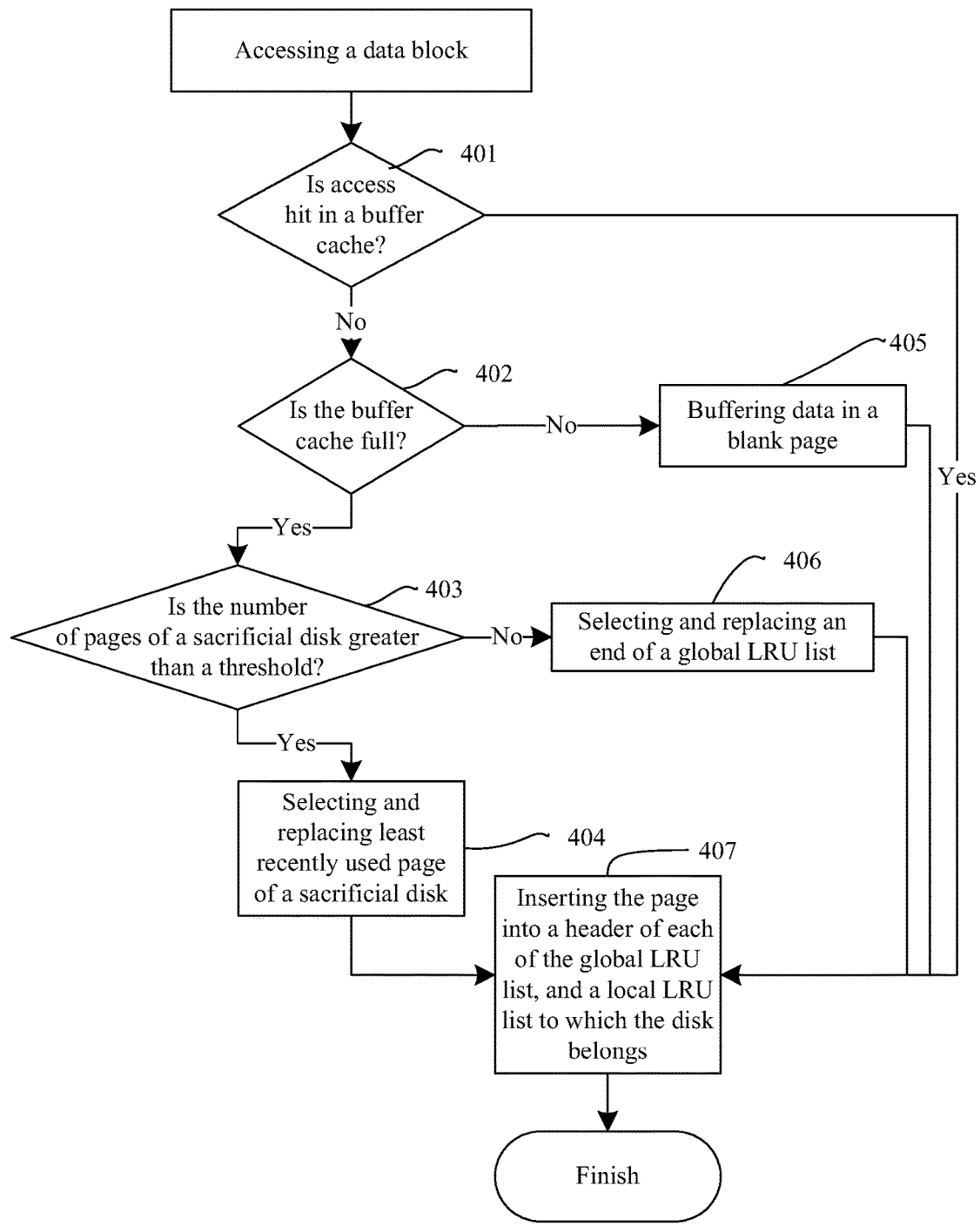
FIG. 4 is a flowchart of a LRU-based method for asymmetrically scheduling buffer cache of disk array applied to a RAID-10 system.

As shown in FIG. 4, a LRU-based method for asymmetrically scheduling buffer cache of disk array applied to the RAID-10 system comprises steps of:

S401: detecting whether access from a upper layer is hit in a buffer cache, proceeding to S407 if yes, and proceeding to S402 if no;

S402: detecting whether the buffer cache is full, proceeding to S403 if yes, and proceeding to S405 if no (indicating there is an empty page available);

S403: detecting whether the number of pages of a sacrificial disk is greater than a threshold, proceeding to S404 if yes, and proceeding to S406 if no;

S404: selecting and replacing a least recently used page of the sacrificial disk (namely a cold page of the sacrificial disk);

S405: buffering data requested by a user in a blank page in the buffer cache, and reading or writing the data;

S406: selecting and replacing an end of the global LRU list (namely all cold pages of the buffer cache);

S407: reading or writing the data, and inserting the page into a header of the global LRU list, and a local LRU list to which the disk belongs.

In S404, selecting the least recently used page of the sacrificial disk (namely a cold page thereof) is to find a page of the first sacrificial disk obtained by searching upwardly from the end of the global LRU list.

Preferably, the least recently used page of the sacrificial disk can be selected by comparing timestamps at the end of local LRU lists of all sacrificial disks.

Preferably, the above-mentioned selection method can rotate ends of local LRU lists of all sacrificial disks thereby obtaining the least recently used page of the sacrificial disk.

It should be noted that except for the above-mentioned LRU algorithm, the invention can also be used in combination with algorithms such as Least Frequently Used (LFU), Least Recently/frequently Used (LRFU), Two Queue (2Q), Multi-Queue (MQ), Low Inter-reference Recency Set (LIRS), Adaptive Replacement Cache (ARC) and so on, and selection of a cold page is determined by calculation of weights of buffer pages in these algorithms.

To summarize, this invention provides a method for asymmetrically scheduling buffer cache of disk array, which is capable of reducing the number of accessing the reconstructed disk and the failed disk, and thus the number of I/O requests, increasing a reconstruction speed of the failed disk, decreasing response time of the I/O requests, and improving performance, availability and reliability of the disk array by decreasing buffer size of the sacrificial disk, and increasing buffer size of the reconstructed disk and the failed disk.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for asymmetrically scheduling buffer cache of disk array, the method comprising:
   (1) detecting whether access from a upper layer is hit in a buffer cache, proceeding to (7) if yes, and proceeding to (2) if no;
   (2) detecting whether said buffer cache is full, proceeding to (3) if yes, and proceeding to (5) if no;
   (3) detecting whether the number of pages of a sacrificial disk is greater than a threshold, proceeding to (4) if yes, and proceeding to (6) if no, said sacrificial disk being a disk not involved in disk reconstruction;
   (4) selecting and replacing a cold page of said sacrificial disk;
   (5) buffering data requested by a user in a blank page in said buffer cache;
   (6) selecting and replacing all cold pages of said buffer cache; and
   (7) reading or writing said data, and changing positions or status thereof in pages of said buffer cache.

2. The method of claim 1, wherein as said method is applied to a RAID-6 system in which 1 out of n disks fails, said sacrificial disk selects any one of n−1 survival disk, and reads remaining n−2 disks for reconstructing data on said failed disk, where n is greater than or equal to 3.

3. The method of claim 1, wherein as said method is applied to a RAID-10 system in which 1 out of n disks fails, a mirror disk of said failed disk is read for reconstructing data, and remaining n−2 disks are sacrificial disks, where n is greater than or equal to 4.

4. The method of claim 1, wherein said threshold is proportional to an arrival rate of a user's I/O request.

5. The method of claim 1, wherein as said method is based on a LRU algorithm, said buffer cache comprises a global LRU list and a local LRU list, said local LRU list operates to store buffer pages of one disk, and said global LRU list operates to store buffer pages of all disks.

6. The method of claim 5, wherein in (4), said cold page of said sacrificial disk is an end of a local LRU list corresponding to said sacrificial disk.

7. The method of claim 5, wherein in (6), each of said cold pages of said buffer cache is an end of said global LRU list.

8. The method of claim 5, wherein in (4), said cold page of said sacrificial disk is a first page obtained by searching upwardly from an end of said global LRU list.

9. A method for asymmetrically scheduling buffer cache of disk array, the method comprising:
   (1) detecting whether access from a upper layer is hit in a buffer cache, proceeding to (7) if yes, and proceeding to (2) if no;
   (2) detecting whether said buffer cache is full, proceeding to (3) if yes, and proceeding to (5) if no;
   (3) detecting whether response time of a sacrificial disk is greater than that of remaining disks, proceeding to (4) if yes, and proceeding to (6) if no, said sacrificial disk being a disk not involved in disk reconstruction;
   (4) selecting and replacing a cold page of said sacrificial disk;
   (5) buffering data requested by a user in a blank page in said buffer cache;
   (6) selecting and replacing all cold pages of said buffer cache; and
   (7) reading or writing said data, and changing positions or status thereof in pages of said buffer cache.

10. The method of claim 9, wherein as said method is applied to a RAID-6 system in which 1 out of n disks fails, said sacrificial disk selects any one of n−1 survival disk, and reads remaining n−2 disks for reconstructing data on said failed disk, where n is greater than or equal to 3.

11. The method of claim 9, wherein as said method is applied to a RAID-10 system in which 1 out of n disks fails, a mirror disk of said failed disk is read for reconstructing data, and remaining n−2 disks are sacrificial disks, where n is greater than or equal to 4.

12. The method of claim 9, wherein said threshold is proportional to an arrival rate of a user's I/O request.

13. The method of claim 9, wherein as said method is based on a LRU algorithm, said buffer cache comprises a global LRU list and a local LRU list, said local LRU list operates to store buffer pages of one disk, and said global LRU list operates to store buffer pages of all disks.

14. The method of claim 13, wherein in (4), said cold page of said sacrificial disk is an end of a local LRU list corresponding to said sacrificial disk.

15. The method of claim 13, wherein in (6), each of said cold pages of said buffer cache is an end of said global LRU list.

16. The method of claim 13, wherein in (4), said cold page of said sacrificial disk is a first page obtained by searching upwardly from an end of said global LRU list.

* * * * *